No. 665,474. Patented Jan. 8, 1901.
R. SCHMIDT.
LATHE.
(Application filed Aug. 18, 1900.)
(No Model.)
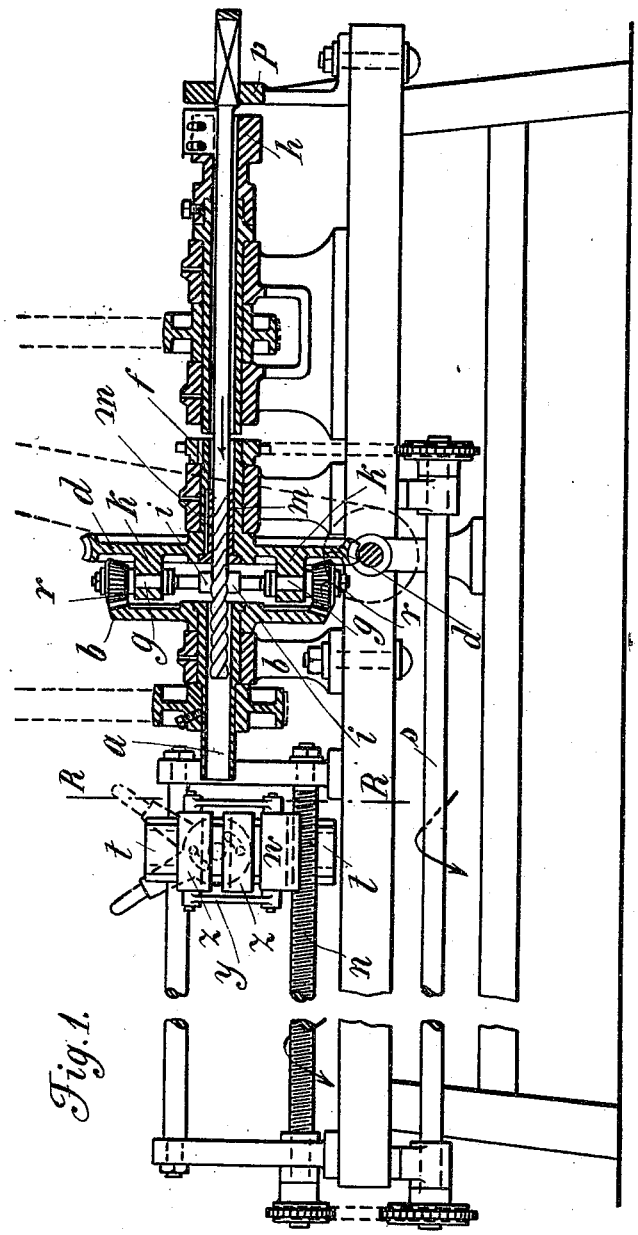
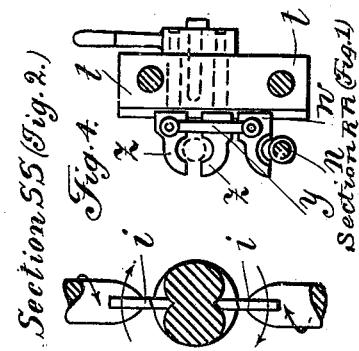
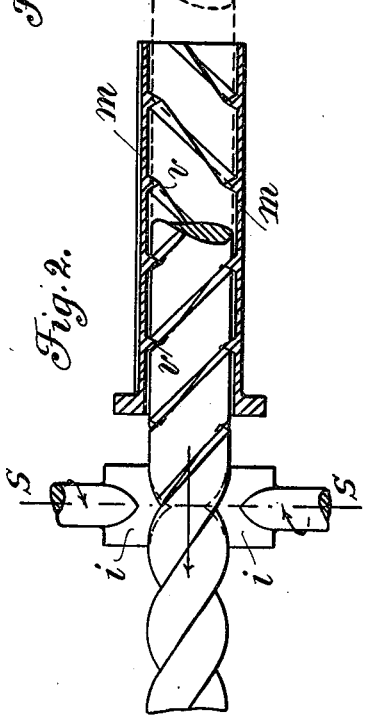
Witnesses:
Inventor:
Richard Schmidt

UNITED STATES PATENT OFFICE.

RICHARD SCHMIDT, OF PORTITZ, GERMANY.

LATHE.

SPECIFICATION forming part of Letters Patent No. 665,474, dated January 8, 1901.

Application filed August 18, 1900. Serial No. 27,299. (No model.)

*To all whom it may concern:*

Be it known that I, RICHARD SCHMIDT, a subject of the King of Saxony, and a resident of Portitz, near Leipsic, Saxony, Germany, have invented certain new and useful Improvements in Lathes, of which the following is a description.

The present invention consists of a lathe for turning rods or bars having spirally-wound grooves thereon, and comprises the details of construction hereinafter set forth, and particularly pointed out in the claims.

In order to render the present specification easily intelligible, reference is had to the accompanying drawings, in which similar letters of reference denote similar parts throughout the several views.

Figure 1 is a longitudinal section through the lathe; Fig. 2, a detail section through the transporting-sleeve; Fig. 3, a section on line S S of Fig. 2, and Fig. 4 a section on line R R of Fig. 1.

The hollow sleeve $f$ is driven by suitable driving pulley and belt and carries keyed thereto the disk $d$, having laterally-extending lugs $k$ on its face, which form bearings for spindles $g$, having the cutting-tools $i$ at their lower ends. The upper ends of these spindles are provided with bevel-gears $r$, which mesh with the teeth of a common bevel-gear $b$, keyed to a sleeve $a$, which is rotated independently of the sleeve $f$ by means of a suitable belt-pulley and belt. Keyed to the sleeve $f$ is an interior sleeve $m$, Fig. 2, having interiorly-projecting spirally-wound cutter edges $v$, which cut into the rod or bar being worked and serve to transport the same as the sleeve $m$ is turned with the sleeve or hollow shaft $f$. The speed of rotation of the hollow shafts $f$ and $a$ is regulated according to the pitch of the spiral to be cut, as will be evident. The cutter-head $h$ is advantageously mounted in front of the tools $i$, and in front of that again the guide $p$, through which the rod having a square section is passed and prevented from rotation. In order to prevent the rod from rotation and to further transport the same after the square end thereof has passed through the guide $p$, the standard at the opposite side of the cutter mechanism is provided with clamping-cheeks $z$, carrying by means of links $y$ $y$ a half-sleeve $w$, which when the clamping-cheeks are clamped together passes down and fits onto a rotary screw-spindle $n$, suitably mounted in the frame of the machine and driven by means of suitable chain or other gearing from the spindle $s$, which receives its motion from the sleeve $f$. Thus when the square end of the rod or bar has left the guide $p$ the clamps $z$ $z$ grip the same and the support $t$ moves with the rod by means of the said screw-spindle $n$.

The device operates in the following manner: The cutter-tools are rotated on their axes and around their sleeve $f$ by means of the bevel-gears $b$ and $r$, while the rotation of the disk $d$, with the sleeve $m$, gradually advances the rod or bar. The tools cut the grooves and shape the said bar, and as soon as the square end of the same has passed out of the guide $p$ the clamps $z$ $z$ are closed by hand and the transport continues to the end by means of the spirally-wound cutters in the sleeve $m$, the support $t$ receding with the rod or bar by means of its driving mechanism $s$ and $n$.

I claim as my invention—

1. In a lathe for turning spirally-wound rods or bars, the combination of a hollow shaft and means for rotating the same, a disk on the said shaft having thereon rotary spindles carrying at their inner ends the cutter-tools, said tool-spindles being radially disposed on the said disk and having bevel-gears at their outer ends, a hollow shaft mounted concentrically with the said tool-carrying shaft and having a bevel-gear thereon to engage the tool-spindle gears and means for rotating the said hollow shaft independently of the said tool-carrying shaft and means for transporting the rod or bar being worked through the said hollow shafts in the manner and for the purpose substantially as described.

2. In a lathe for turning spirally-wound articles, the combination of a hollow shaft having thereon a disk, a series of radially-arranged cutter-spindles on the said disk, having the cutter-tools toward the center and having bevel-gears at their outer ends, means for rotating the said hollow shaft, a concentrically-arranged hollow shaft and means for driving the same independently of the said tool-carrying shaft, a bevel-gear thereon, to engage all the cutter-spindle gears simultaneously, a guide-head to guide the square end of the rod or bar being worked, and a support for the cutter-tools, clamping-cheeks on the same to close down onto the said bar or rod, a half-sleeve having interior threads suspended from the upper of the two clamping-cheeks, a rotary spindle having screw-threads thereon below the said half-sleeve and means for bringing the said half-sleeve and the screw-spindle into engagement when the clamping-cheeks are drawn together in the manner and for the purpose substantially as described.

In witness whereof I have hereunto set my hand in presence of two witnesses.

RICHARD SCHMIDT.

Witnesses:
HERM. SACK,
RUDOLPH FRICKE.